United States Patent

Woodward

[15] 3,659,499
[45] May 2, 1972

[54] VACUUM MOTOR ADAPTED FOR USE IN A VEHICLE SPEED CONTROL MECHANISM

[72] Inventor: Gary F. Woodward, Ann Arbor, Mich.
[73] Assignee: Ford Motor Company, Dearborn, Mich.
[22] Filed: Oct. 2, 1970
[21] Appl. No.: 77,501

Related U.S. Application Data

[62] Division of Ser. No. 781,170, Dec. 4, 1968, Pat. No. 3,572,214.

[52] U.S. Cl. .................................91/454, 91/1, 91/361
[51] Int. Cl. ..................................F15b 13/044, F15b 13/16
[58] Field of Search ............92/5; 91/361, 454, 1; 123/102

[56] References Cited

UNITED STATES PATENTS

| 2,627,183 | 2/1953 | Greenwood, Jr. et al. | 92/5 |
| 3,020,888 | 2/1962 | Braun | 91/1 X |
| 3,453,937 | 7/1969 | Haberman | 92/5 |
| 3,477,346 | 11/1969 | Slavin et al. | 91/361 |
| 3,524,634 | 8/1970 | Schmidt | 92/5 X |

Primary Examiner—Martin P. Schwadron
Assistant Examiner—Irwin C. Cohen
Attorney—John R. Faulkner and Keith L. Zerschling

[57] ABSTRACT

A vacuum motor which is especially adapted for use in a speed control mechanism for an automotive vehicle in which a flexible diaphragm is positioned in the housing of the motor and cooperates with the housing to form a chamber. Means are provided communicating with the chamber and the flexible diaphragm for applying a varying pressure to the chamber and hence the diaphragm so that the diaphragm is moved as a function of the pressure applied thereto. The diaphragm is adapted to be connected to a movable controller means for controlling the speed of the vehicle in accordance with the position of the diaphragm. Movable means are coupled to the diaphragm and are positioned within the chamber. The vacuum motor includes electrical circuit means and said movable means cooperates with the electrical circuit means for varying the value of a parameter of the electrical circuit means as a function of the position of the diaphragm and the movable means.

2 Claims, 6 Drawing Figures

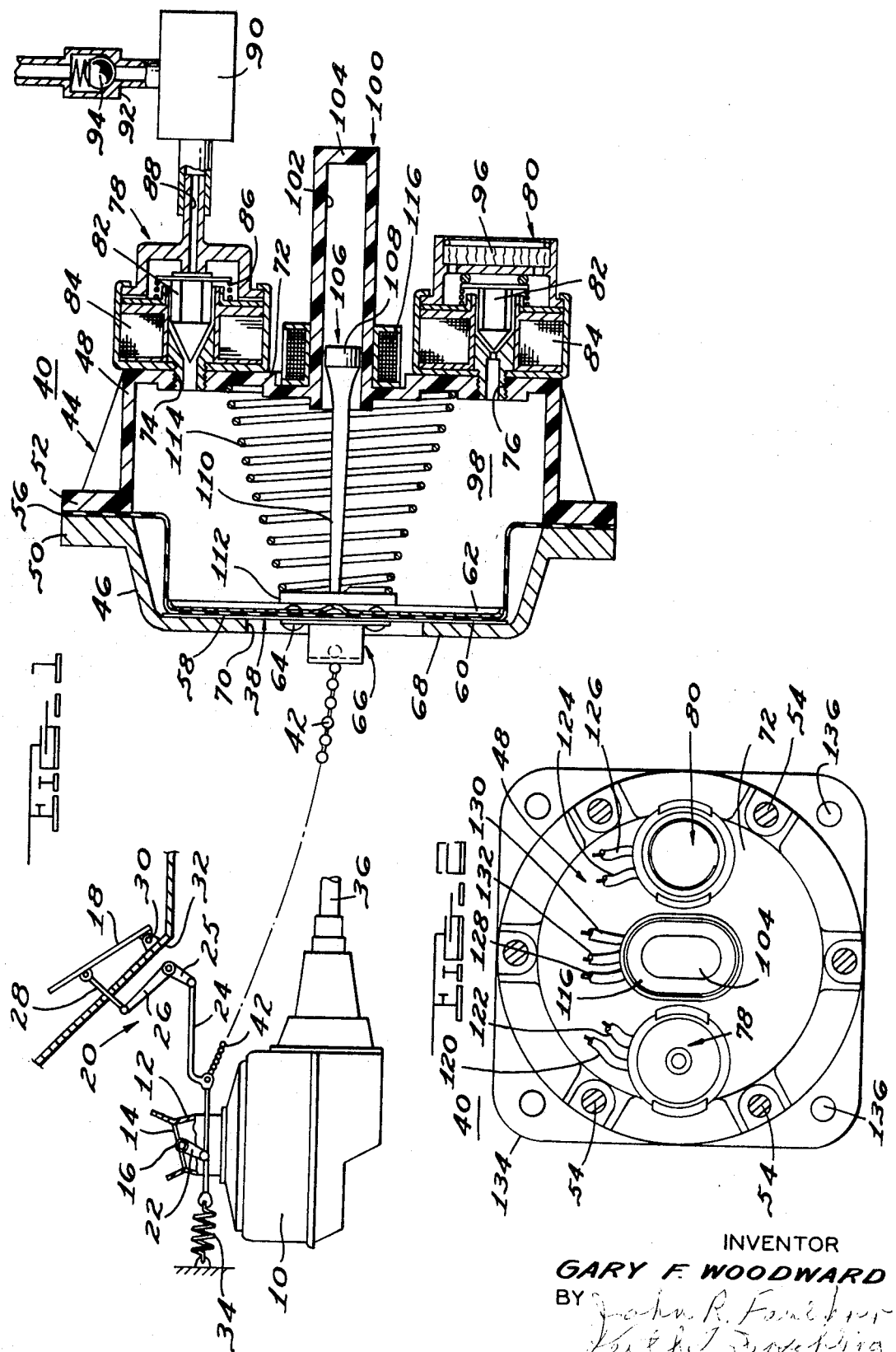

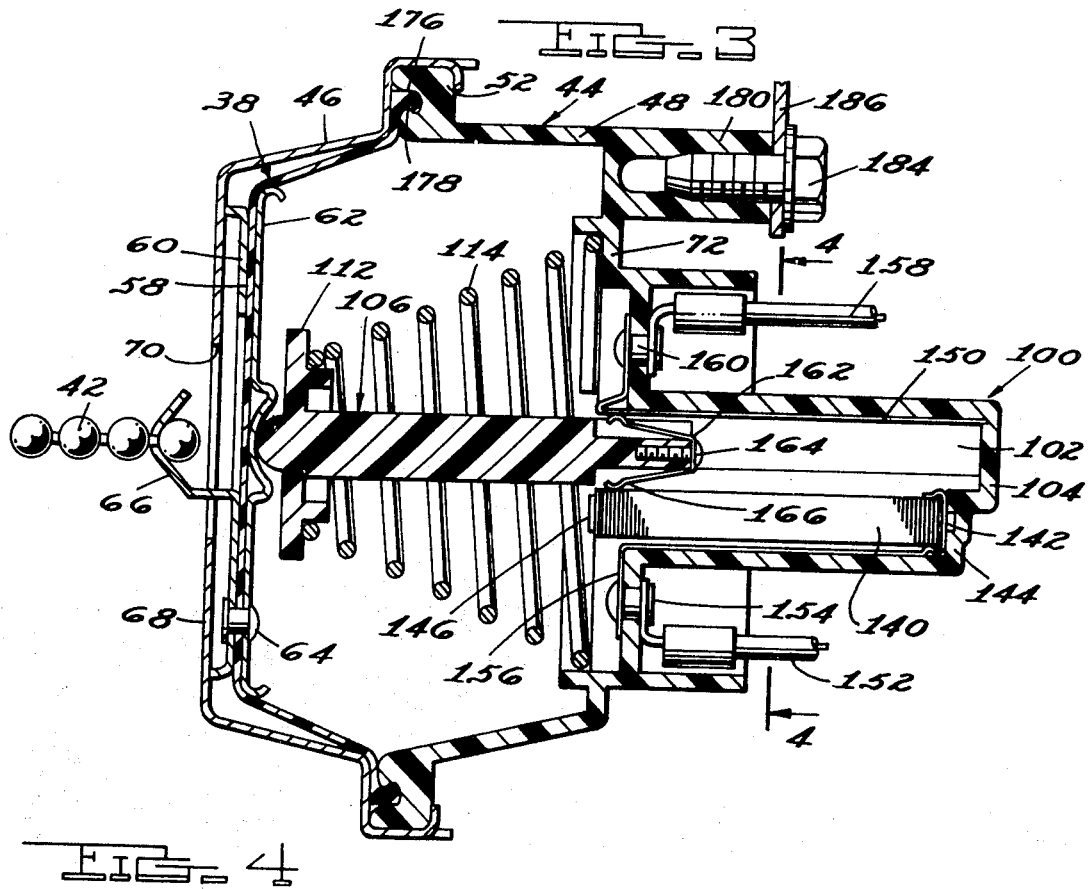
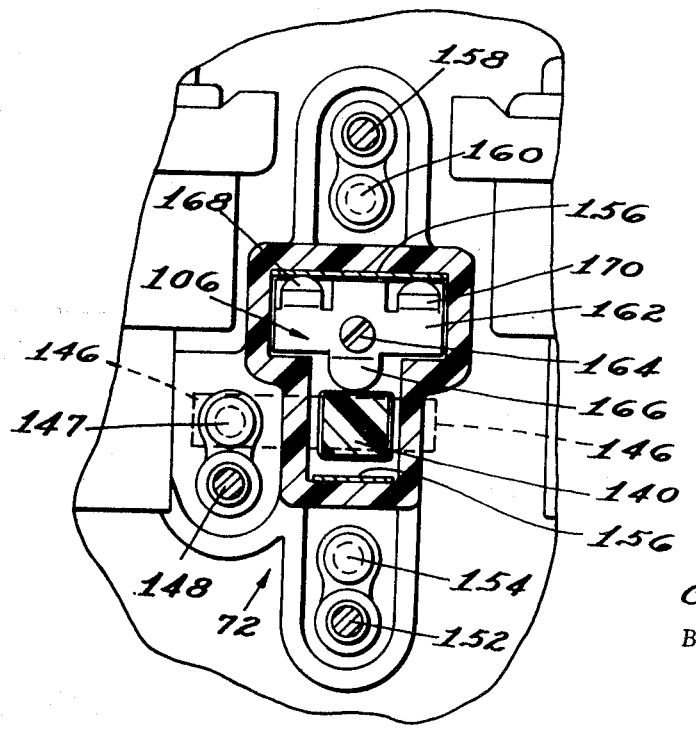

Patented May 2, 1972
3,659,499
3 Sheets-Sheet 3
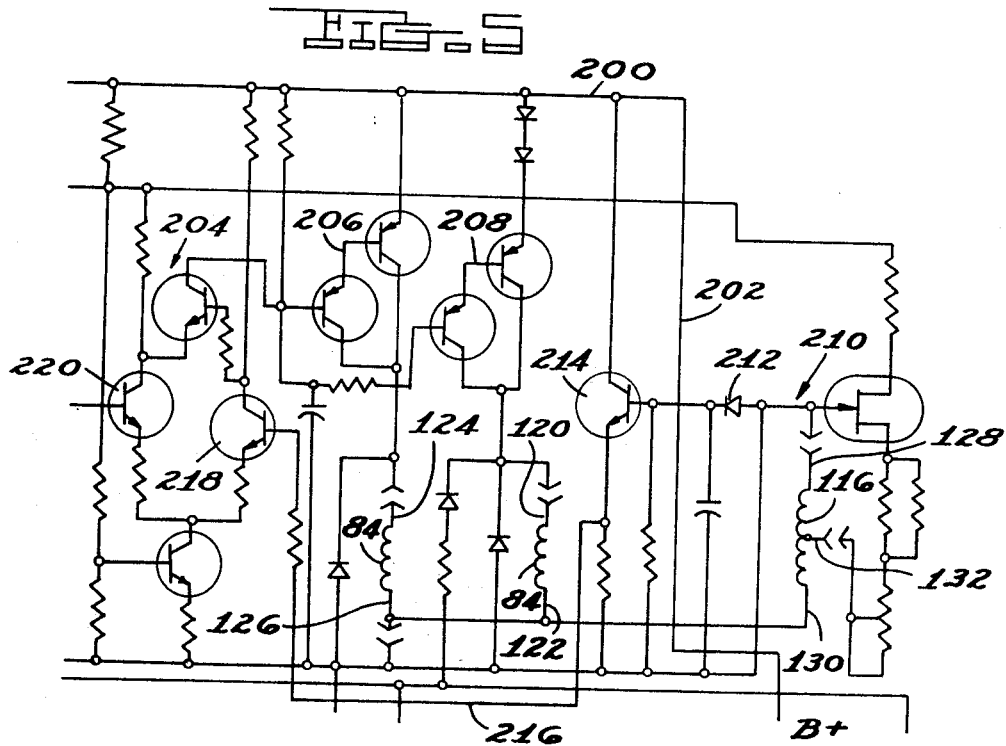
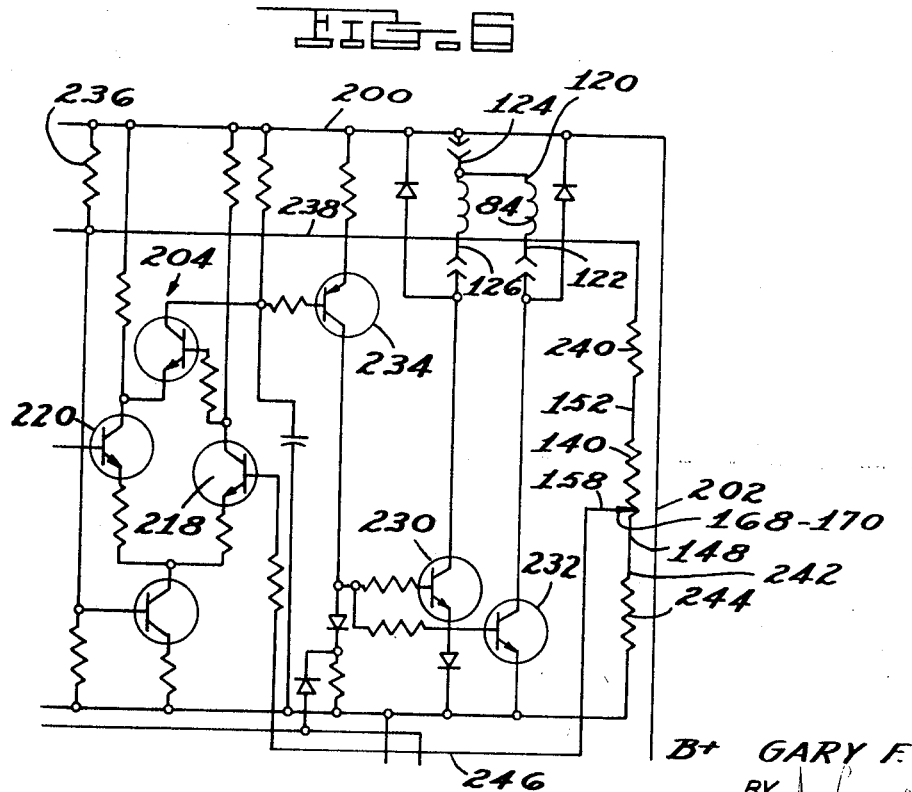
INVENTOR
GARY F. WOODWARD
BY
ATTORNEYS

VACUUM MOTOR ADAPTED FOR USE IN A VEHICLE SPEED CONTROL MECHANISM

This application is a division of my copending application, Ser. No. 781,170 filed Dec. 4, 1968, now U.S. Pat. No. 3,572,214.

BACKGROUND OF THE INVENTION

There are many speed control mechanisms in the prior art employed to maintain the speed of an automobile at a substantially preset level. In these prior art speed control mechanisms, a vacuum motor or actuator is employed to control the movement of a controller means or throttle positioned in the intake system of the internal combustion engine of the vehicle. In certain of these systems an externally mounted feedback potentiometer or variable resistor is coupled to the output shaft of the vacuum motor that in turn is coupled to the speed controller means or throttle. The feedback potentiometer or variable resistor provides a feedback signal to a control means as a function of the position of the diaphragm of the motor and hence the position of the movable controller or throttle of the internal combustion engine.

These feedback potentiometers or variable resistors are positioned externally of the vacuum motor or actuator and are subjected to the ambient atmosphere present in the engine compartment of the vehicle. It can readily be appreciated that this ambient atmosphere may be severely contaminated with oil vapors, dust particles and other contaminants which will in time seriously affect the operating performance of the potentiometer. It may cause spurious and inaccurate signals to be generated by the potentiometer and, in addition, may, in time, render it totally inoperative.

The present invention remedies the above mentioned difficulties by providing means positioned within the chamber of the vacuum motor for varying the value of a parameter of an electrical circuit which may be connected to produce a voltage which is a function of the position of the diaphragm of the vacuum motor. All movable parts of the mechanism for providing the output voltage or feedback signal to other controlling electrical or electronic components of the speed control system are unaffected by the contaminants ordinarily found in the engine compartment.

SUMMARY OF THE INVENTION

The present invention relates to a vacuum motor suitable for use in a speed control mechanism for an automotive vehicle, and it comprises a housing having a flexible diaphragm positioned therein and cooperating with the housing to form a chamber. Means are provided, preferably in the form of a normally open valve communicating with the atmosphere and a normally closed valve communicating with a source of vacuum, for applying varying pressures to the chamber and against the diaphragm so that the diaphragm is moved as a function of the pressure in the chamber and applied to the diaphragm.

The diaphragm is adapted to be connected to a movable controller means, preferably in the form of a throttle, positioned in the carburetor of the internal combustion engine of the vehicle for controlling the speed of the vehicle in accordance with the position of the diaphragm. Movable means are coupled to the diaphragm and are positioned within the chamber to move in accordance with the position of the diaphragm. This movable means varies the value of a parameter of an electrical circuit means as a function of the position of the diaphragm. External circuit means and a source of electrical energy are adapted to be coupled to the electrical circuit means for producing an output or feedback voltage which is proportional to the position of the diaphragm and results from the change in impedance in the electrical circuit means as the value of a parameter is varied.

In one form of the invention, the electrical circuit means comprises a coil positioned on the exterior of the housing of the vacuum motor and is adapted to be connected in an oscillator circuit. The movable means coupled to the diaphragm comprises a shaped metallic slug, preferably constructed of a ferromagnetic material, that passes through the center of the coil and varies its inductance and the effective resistance across it as a function of the position of the iron slug. The output voltage from the oscillator may be varied linearly with respect to the position of the diaphragm and the slug. This voltage is fed to an electronic or electrical control system which processes it as a feedback voltage proportional to the position of the controller means or throttle of the vehicle.

IN another embodiment of the invention, the electrical circuit means comprises a variable resistor positioned within the chamber and the movable means includes a contact positioned against the variable resistor so that the output voltage from the variable resistor may be a linear function of the position of the diaphragm and hence the position of the above mentioned controller means or throttle.

Suitable filtering means are provided in the atmosphere valve for both embodiments of the vacuum motor so that all movable parts operate in an atmosphere which is free of dirt, engine vapors and other contaminants which might reduce operating life and affect the accuracy of the output voltage from the above described circuits.

An object of the invention is the provision of a vacuum motor for use in a speed control mechanism of an automotive vehicle in which means are positioned within a chamber of the vacuum motor for varying the value of a parameter of an electrical circuit means either coupled to or positioned within the chamber of the vacuum motor.

A further object of the invention is the provision of a vacuum motor suitable for use in a speed control mechanism in an automotive vehicle that includes circuit means, the value of a parameter of which is varied as a function of the position of the diaphragm of the vacuum motor and in which all moving parts for producing this change of value of the parameter are positioned within a contaminant-free environment in the operating chambers of the vacuum motor.

Other objects and attendant advantages of the present invention may be more readily realized as the drawings are considered in connection with the description of the preferred embodiments.

BRIEF DESCRIPTION OF THE DRAWINGS

FIG. 1 is a schematic view of a portion of a speed control mechanism for an automotive vehicle and includes a sectional view through one embodiment of the vacuum motor of the present invention;

FIG. 2 is a top plan view of the vacuum motor shown in FIG. 1;

FIG. 3 is a sectional view through another embodiment of the vacuum motor of the present invention;

FIG. 4 is a top plan view, partially in section, of the vacuum motor shown in FIG. 3 and taken along the lines 4—4 of FIG. 3;

FIG. 5 is a partial circuit diagram of a speed control mechanism employing the vacuum motor shown in FIGS. 1 and 2;

FIG. 6 is a partial schematic view of a similar speed control mechanism for an automotive vehicle employing the vacuum motor shown in FIGS. 3 and 4.

DESCRIPTION OF THE PREFERRED EMBODIMENTS

Referring now to the drawings in which like reference numerals designate like parts throughout the several views thereof, there is shown in FIG. 1 an internal combustion engine 10 having an air intake means 12 which may be part of a carburetor mounted on the internal combustion engine 10. The carburetor has a movable controller means 14 which may be in the form of a carburetor throttle plate pivotally mounted for rotation about a pivot 16. The controller means or throttle plate 14 may be conventionally connected to an accelerator pedal 18 through a conventional linkage system 20 comprising arm 22, link 24, link 25, link 26 and link 28. The accelerator pedal may be pivotally mounted at 30 to the floor board 32 of the vehicle.

The controller means or throttle plate 14 is biased to its closed position by means of a tension spring 34 having one end thereof affixed to the link 24. When the accelerator pedal 18 is depressed, the controller means or throttle plate 14 will be rotated counterclockwise, as shown in FIG. 1, toward its open position through the linkage means 20 to provide more air for the internal combustion engine 10 and thus increase its speed. A driveshaft 36 from the internal combustion engine 10 may be connected to the driving wheels of the automotive vehicle through a conventional transmission and driveline. The link 24 and hence the controller means 14 or carburetor throttle is also connected to a diaphragm 38 of a vacuum motor or power actuator 40 through a suitable chain-type connector 42.

The vacuum motor or power actuator 40 comprises a housing 44 having a first cup-shaped portion 46 and a second cup-shaped portion 48. The cup-shaped portions 46 and 48 each have radially extending flanges 50 and 52, respectively, which are connected together by means of a plurality of bolts or screws 54. The diaphragm 38 is constructed of a flexible, elastomeric material and has its outer periphery, designated by the numeral 56, trapped and suitably affixed between the flanges 50 and 52.

The main body portion 58 of the diaphragm 38 is positioned between an outer metallic plate 60 and an inner metallic cup-shaped plate 62, with the main body portion 58 being affixed between the two plates 60 and 62 by a plurality of rivets 64. The rivets 64 are also employed to affix the main body portion 58 of the diaphragm 38 to a hook-like connecting member 66 that receives one end of the chain-like connecting member 42. This diaphragm construction described above is conventional, and further description is considered unnecessary.

The cup-shaped portion 46 of the housing 44 may be constructed of any suitable material, and it includes an end wall 68 having a central aperture 70 positioned therein so that atmospheric pressure may be applied to the side of the diaphragm 38 that is positioned against the outer plate 60.

The other cup-shaped portion 48 of the housing 44 is constructed of an insulating material, for example, plastic; and it has an end wall 72 positioned in generally spaced parallel relationship with respect to the end wall 68 of the cup-shaped portion 46 of the housing 44. This end wall 42 has a pair of spaced threaded bores 74 and 76 that receive a normally closed vacuum valve 78 and a normally open atmospheric valve 80, respectively. The vacuum valve 78 and the atmospheric valve 80 are conventional in construction and will be described only to the extent necessary for an understanding of the invention. Each of these valves includes a ferromagnetic shuttle or valve member 82 each of which is controlled by means of separate solenoid or winding 84.

The shuttle or valve member 82 of the vacuum valve 78 is spring biased by a spring 86 into a position to cover the end of conduit 88. The valve member or shuttle 82 is fluted so that fluid may flow through the valve when the winding 84 is actuated and the valve member or shuttle 82 is moved to the left as shown in FIG. 2 to uncover the conduit 88. The conduit 88 is connected to a vacuum accumulator 90 which may be suitably connected through a conduit 92 and a check valve 94 to the intake manifold of the internal combustion engine 10. On the other hand, the atmospheric valve 80 is normally open, as shown, so that atmospheric pressure may force air through a filter 96 into chamber 98 that is formed by the cup-shaped portion 48 of the housing 44 and the diaphragm 38. The filter 96 removes dirt, oil vapors and other contaminants that are normally present in the engine compartment of an automotive vehicle. It is readily apparent from an inspection of the atmospheric valve 80 that when it is in the position shown in FIG. 1, air may flow into the chamber 98 through the passages shown. When the solenoid or winding 84 is energized, the shuttle or valve member 82 will move to the left, as shown in FIG. 1, thereby restricting the flow of air into the chamber 98 and may, if moved fully to the left as shown in FIG. 1, cut off communication of the chamber 98 with the atmosphere.

The end wall 72 of the cup-shaped portion 48 of housing 44 has a protuberance 100 communicating with the chamber 98 and essentially forming part of it. This protuberance 100 has an axially extending opening 102 positioned therein and a closing end wall 104. The axially extending opening 102 extends at substantially right angles to the end wall 72.

A movable means 106 in the form of a metallic slug, preferably constructed of a ferromagnetic material, extends into the opening 102. This movable means 106 has an enlarged end portion 108, a central, generally tapered portion 110 and a radially extending flange 112 positioned opposite the end 108. A helical compression spring 114 has one end positioned against the end wall 72 and the other end positioned against the radially extending flange 112 of the movable means 106. The radially extending flange 112 is positioned against inner cup-shaped plate 62 so that the compression spring 114 forces outer plate 60 into engagement with end wall 68 of cup-shaped portion 46. As a result, the diaphragm 38 and the movable means 106 will be positioned, as shown in FIG. 1, when the speed control mechanism is inoperative.

A coil or winding 116 is positioned about the protuberance 100 and against the end wall 72 of the cup-shaped housing member 48. Thus, when the diaphragm is positioned, as shown in FIG. 1, with the plate 60 in engagement with the end wall 68, the enlarged end portion 108 of the movable means 106 is positioned within the central opening in coil or winding 116.

As shown in FIG. 2, the winding 84 of the vacuum valve 78 has terminating leads 120 and 122 and the winding 84 of the atmosphere valve 80 has terminating leads 124 and 126. Additionally, the coil or winding 116 has terminating leads 128 and 130 as well as a center tab lead 132. Additionally, the housing 44 and, more particularly, the cup-shaped housing portion 48 has an outwardly extending mounting flange 134 with a plurality of apertures 136 positioned therein for mounting the vacuum motor 40 on any suitable mounting plate in an automotive vehicle.

Another embodiment of the vacuum motor of the present invention is shown in FIGS. 3 and 4. This vacuum motor is similar to the vacuum motor shown in FIGS. 1 and 2 except the electrical circuit means, instead of taking the form of a coil or winding 116, comprises a variable resistor 140 positioned in the opening 102 in the protuberance 100. This variable resistor 140 may be in the form of a wound resistor card having one end 142 affixed in an off-set portion 144 of the end wall 104 of the protuberance 100 and having the other end carried by an electrically conductive metallic strip 146 affixed to the end wall 72 by means of a conductive rivet 147. A lead 148 is connected to the conductive rivet, as shown in FIG. 4. Additionally, a conductive strip 150 is positioned in the opening 102 of the protuberance 100 along a wall opposite the variable resistor 140. The end of the wire of the variable resistor 140 at end 142 is connected to a lead 152 via a conducting rivet 154 and a conductive strip 156. The conductive strip 150 is connected to lead 158 via conductive rivet 160.

The movable means 106 in the vacuum motor, shown in FIGS. 3 and 4, comprises an elongated pin or staff constructed of a plastic material and having a U-shaped conducting strip 162 positioned at the end thereof and carried thereby through a suitable fastening means 164. This conducting strip may be constructed of a spring material and it has a contact 166 engaging the wire of the variable resistor 140 and a pair of contacts 168 and 170 engaging the conductive strip 150.

Additionally, as can be seen in the drawing, the cup-shaped housing portion 46 may be constructed of a sheet metal material which is crimped over outwardly extending flange 52 of the cup-shaped housing portion 48. A peripheral lip 176 of the diaphragm 38 is trapped in sealing relationship in a groove 178 positioned in flange 52 by means of the sheet metal of the cup-shaped housing portion 46.

The embodiment of the vacuum motor, shown in FIGS. 3 and 4, also includes the vacuum valve 78 and the atmospheric valve 80, as shown in the embodiments of the invention in FIGS. 1 and 2, and the vacuum valve 78 is connected, as shown in FIG. 1, with the vacuum accumulator 90. In addition, the cup-shaped housing portion 48 of the housing 44 has a plurality of bosses 180 for the reception of mounting bolts 184 which may be employed to suitably mount the vacuum motor, as disclosed in FIGS. 3 and 4, on a mounting plate 186.

In both of the embodiments shown in FIGS. 1 and 2 and in FIGS. 3 and 4, the cup-shaped portion 48 of the housing 44 is constructed of an insulating plastic material in order to magnetically and electrically isolate or insulate the movable means 106 and the electrical circuit means comprising winding or coil 116 or variable resistor 140 from the housing 44.

Referring now to FIG. 5, there is shown a partial circuit diagram of an electronic circuit for a speed control system which incorporates and operates the vacuum motor shown in FIGS. 1 and 2. This electronic circuit forms no part of the present invention and is more fully disclosed and described in copending application Ser. No. 781,183, filed Dec. 4, 1968, now U.S. Pat. No. 3,556,245, in the name of Bernard G. Radin; and in copending application Ser. No. 798,672, filed Feb. 12, 1969, now U.S. Pat. No. 3,575,256, in the names of Zbigniew J. Jania and Elliot Josephson. Both of these applications are assigned to the assignee of the present invention.

In this circuit the line 200 may be energized from a source of electrical energy through lead 202 and certain control switches of the speed control system fully described in the copending application Ser. No. 798,672, filed Feb. 12, 1969, in the names of Zbigniew J. Jania and Elliot Josephson. The line 200 supplies operating voltage for the various electrical components, shown in FIG. 5, which include a differential amplifier 204, a first Darlington amplifier 206, a second Darlington amplifier 208 and an oscillator of the feedback type 210. The output of the differential amplifier 204 is connected to the input of the two Darlington amplifiers 206 and 208, and the outputs of the two Darlington amplifiers are connected in series with the winding 84 of the atmospheric valve 80 and the winding 84 of the vacuum valve 78, respectively. The oscillator 210 produces an output which is rectified by diode 212 and is applied to the base of transistor 214 which amplifies the output of the oscillator 210. The output of the amplifier 214 is fed through lead 216 to the base of transistor 218 forming a portion of the differential amplifier 204. A speed error signal is applied to the input of transistor 220 forming another portion of the differential amplifier 204. The output of the amplifier or transistor 214 applied to the input of transistor 218 is a voltage which is proportional to the displacement of the main body portion 58 of the diaphragm 38 away from the wall 68 of the cup-shaped housing member 46. This is accomplished through the use of the movable means 106 comprising a metallic slug, preferably of a ferromagnetic material which changes the inductance of the winding 116 and the effective resistance appearing across it as a function of the displacement of the main body portion 58 of the diaphragm 38 from the wall 68 of the cup-shaped housing portion 46.

In operation, if the speed error signal applied to transistor 220 and the signal applied from the output of the oscillator 210 to transistor 218 of the differential amplifier 204 indicates that the vehicle is operating at a speed lower than the desired speed, the winding 84 of the vacuum valve 78 will be energized more fully thereby opening the vacuum valve and the winding 84 of the atmosphere valve 80 will be energized more fully thereby closing this atmosphere valve. As a result, an increased vacuum is produced in the chamber 98 and atmospheric pressure applied through the aperture 70 in the end wall 68 of cup-shaped housing portion 46 will move the main body portion 58 of diaphragm 38 and the movable means 106 to the right, as shown in FIG. 1, against the bias of the spring 114. This causes the movable means 106 in the form of the metallic slug to be inserted further within the opening 102 of the protuberance 100 and causes an increased force to be applied through chain member 42 to link 24 of the accelerator linkage 20 thereby rotating the controller member or throttle plate 14 more fully counterclockwise and opening it more fully. This will increase the speed of internal combustion engine 10 and the vehicle until balanced conditions are reached.

At the same time, the movement of the movable means 106, with respect to the coil 116 contained in the oscillator, will cause a change of inductance in the winding 116 and hence its inductive reactance, and will also change the effective resistance appearing across it. The further the movable member 106 is moved to the right and is inserted in the opening 102 in the protuberance 100, the less will be the inductance and inductive reactance of the winding 116 and the less will be the effective resistance appearing across it, thereby the greater will be the output voltage of the oscillator 210. This increased voltage from the oscillator 210 will be applied through transistor-amplifier 214 to transistor 218 of differential amplifier 204 thereby causing an output signal to Darlington amplifiers 206 and 208 which will balance the system.

If the speed of the vehicle increases above a desired speed, the opposite situation will take place with the atmospheric valve 80 moving to an open position and the vacuum valve 78 moving to a closed position. This results in an increased pressure in the chamber 98 moving the main body portion 58 of diaphragm 38 to the left as shown in FIG. 2, thereby causing spring 34 attached to the link 24 of the throttle linkage 20 to rotate controller member or throttle plate 14 toward its closed position. This reduces the speed of internal combustion engine 10 and the speed of the vehicle. When this happens, the movable means 106, in the form of the metallic slug, will move to the left, as shown in FIG. 1, and will increase the inductance and inductive reactance of the winding 116 and will also increase the effective resistance appearing across it. This results in the decreased output from the oscillator 210 and a decreased voltage applied to the transistor 218 through amplifying transistor 214. Consequently, this voltage in combination with any change of voltage applied to the input of transistor 220 will, through the differential amplifier 204 and the Darlington amplifiers 206 and 208, bring the system back into balance so that the vehicle will then travel at the desired speed.

It should be appreciated that the movable member in the form of metallic slug, preferably constructed of ferromagnetic material, changes the inductance of winding 116 and its inductive reactance when coupled in the circuit of oscillator 210. The metallic slug also has induced in it eddy currents which appear as an effective resistance connected across the winding 116. The losses caused by the eddy currents are a function of the volume of material magnetically coupled to the coil 116 and the greater the amount of material magnetically coupled to the winding 116, the greater will be the losses and the greater will be the effective resistance coupled across it.

FIG. 6 shows a partial circuit diagram of a speed control system that utilizes the vacuum motor shown in FIGS. 3 and 4. Again, this circuit comprises no part of the invention and is more fully described in copending application Ser. No. 798,672, filed Feb. 12, 1969, in the names of Zbigniew J. Jania and Elliot Josephson and assigned to the assignee of this invention. In this circuit diagram, the line 200 that supplies energy to the components shown is connected to line 202 that may be suitably connected to electrical control switches of the speed control device. In this case, the winding 84 of the atmosphere valve 80 is connected in series with the output of transistor-amplifier 230, while the winding 84 of the vacuum valve 78 is connected in series with the output of transistor-amplifier 232. The inputs to these two amplifiers 230 and 232 are connected to amplifying transistor 234 which in turn is connected to the output of differential amplifier 204. The variable resistor 140 is connected in the circuit, as shown, so that the lead 152 connected to one end of the resistor receives current from the line 200 through resistor 236, line 238 and resistor 240. The current flowing out of the variable resistor 140 flows out of lead 148 through lead 242 and resistor 244. The contacts 168 and 170, shown by the arrow in FIG. 6, which provide the movable arm of the variable resistor 140 are connected through leads 158 and 246 to the input of transistor 218 of differential amplifier 204.

With the vacuum motor, in the position shown in FIG. 3, the voltage output from the variable resistor 140 applied to lead 246 and to the input of transistor 218 is at a minimum. In operation as the diaphragm 38 and the movable means 106 moves to the right as shown in FIG. 3, the contacts 166, 168 and 170 will move to the right along with the movable means 106 and provide an increasing voltage output at contacts 168 and 170 and hence an increasing voltage on the line 246 connected to the input of transistor 218 of the differential amplifier 204. As a result, the value of the resistance of the electrical circuit means, in the form of the variable resistor 140, may vary linearly as the position of the main body portion 58 of the diaphragm 38 with respect to the wall 68 of the cup-shaped portion 46 of the housing 44. Stated otherwise, as the movable means 106 moves into the opening 102 in the protuberance 101 and causes the controlling means or throttle plate 14 to open, higher voltages are produced by the variable resistor 140 and are applied to the differential amplifier 218. The operation of the atmosphere valve 80 and the vacuum valve 78 through the electrical energy supplied from the transistors 230 and 232 are the same as that described in relationship to FIG. 5.

The present invention thus provides a unique and novel vacuum motor including means cooperating with external circuit means for producing a feedback voltage which is proportional to and may be linearly related to the position of the diaphragm of the vacuum motor. In other words, as the diaphragm of the vacuum motor is moved to the right, as shown in FIGS. 1 and 3, and the speed of the vehicle increases due to the connection of the diaphragm 38 to the controller means or throttle plate 14, an increasing output voltage, which is in essence a feedback voltage indicating the position of the controller means or throttle plate 14, is produced by the vacuum motors of the present invention.

All the moving parts in both of the embodiments for producing this output voltage by varying the value of a parameter of an electric circuit means that produces the voltage when properly coupled to an external circuit are positioned within the vacuum chamber of the vacuum motors. The atmosphere in the chamber is free of dirt, oil vapors and other contaminants which have been removed by the filtering means positioned on the atmosphere valve connecting this chamber to the atmosphere. Consequently, a reliable, long-lasting and inexpensive vacuum motor with means for producing an output or feedback voltage that varies as a function of the position of the diaphragm and that may vary linearly with the position of the diaphragm is provided in this invention.

The invention disclosed will have many modifications which will be apparent to those skilled in the art in view of the teachings of this specification. It is intended that all modifications which fall within the true spirit and scope of this invention be included within the scope of the appended claims.

I claim:

1. A vacuum motor adapted for use in a speed control system for an automotive vehicle, said vacuum motor comprising: a flexible diaphragm; a housing, said housing being formed by first and second cup-shaped portions having end walls spaced from one another and having radially extending flanges, said diaphragm having its periphery trapped between said radially extending flanges, said first cup-shaped portion having a central aperture therein, and said second cup-shaped portion being non-magnetic and having a protuberance on its end wall extending substantially perpendicular thereto and in a direction away from said first cup-shaped portion, said protuberance having an axially extending closed end opening therein opening into said housing and the end wall of said second cup-shaped portion having a pair of bores therein; a compression spring positioned within said housing between said diaphragm and the end wall of said second cup-shaped portion; an output connector secured to said diaphragm and extending through said central aperture; a ferromagnetic slug coupled to said diaphragm and extending into said opening in said protuberance of said second cup-shaped housing portion, said slug being movable within said opening in response to axial displacement of said diaphragm; an external annular winding surrounding said protuberance of said second cup-shaped housing portion; a solenoid vacuum valve positioned on the exterior of said housing and secured in one of said bores in the end wall of said second cup-shaped housing portion; and a solenoid atmospheric valve positioned on the exterior of said housing and secured in the other of said bores in the end wall of said second cup-shaped housing portion.

2. A vacuum motor in accordance with claim 1, wherein said compression spring is helical and varies in diameter.

* * * * *